United States Patent
Clum et al.

(10) Patent No.: US 11,719,439 B2
(45) Date of Patent: *Aug. 8, 2023

(54) PANEL BURN THROUGH TOLERANT SHELL DESIGN

(71) Applicant: RAYTHEON TECHNOLOGIES CORPORATION, Farmington, CT (US)

(72) Inventors: Carey Clum, East Hartford, CT (US); Dennis M Moura, South Windsor, CT (US)

(73) Assignee: Raythehon Technologies Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/380,494

(22) Filed: Jul. 20, 2021

(65) Prior Publication Data

US 2021/0348761 A1    Nov. 11, 2021

Related U.S. Application Data

(62) Division of application No. 15/903,592, filed on Feb. 23, 2018, now Pat. No. 11,098,899.

(60) Provisional application No. 62/618,841, filed on Jan. 18, 2018.

(51) Int. Cl.
    *F23R 3/00* (2006.01)
(52) U.S. Cl.
    CPC ... *F23R 3/002* (2013.01); *F23M 2900/05004* (2013.01); *F23R 2900/00018* (2013.01); *F23R 2900/03043* (2013.01); *F23R 2900/03045* (2013.01)

(58) Field of Classification Search
    None
    See application file for complete search history.

(56) References Cited

U.S. PATENT DOCUMENTS

| RE32,121 E | * | 4/1986 | Gupta | C23C 4/073 |
| | | | | 428/629 |
| 4,628,694 A | | 12/1986 | Kelm et al. | |
| 4,861,618 A | * | 8/1989 | Vine | C23C 4/02 |
| | | | | 427/454 |

(Continued)

FOREIGN PATENT DOCUMENTS

| AU | 2005203024 | 2/2006 |
| EP | 1528322 | 5/2005 |

(Continued)

OTHER PUBLICATIONS

European Patent Office, European Office Action dated Jul. 27, 2020 in Application No. 19156495.4.

(Continued)

*Primary Examiner* — Jason H Duger
(74) *Attorney, Agent, or Firm* — Snell & Wilmer L.L.P.

(57) ABSTRACT

A dual wall liner for a gas turbine engine may comprise a shell having a first side and a second side, a panel contacting the shell, the panel at least partially defining a hot gas path through which a hot gas flows, wherein the first side of the shell faces the panel, wherein the shell includes a thermal barrier coating (TBC) disposed on the first side of the shell. The TBC may thermally protect the shell from heat from a hot gas path.

6 Claims, 5 Drawing Sheets

(56) References Cited

U.S. PATENT DOCUMENTS

| | | | | |
|---|---|---|---|---|
| 4,885,216 | A | * | 12/1989 | Naik ................... C30B 29/52 148/404 |
| 4,910,092 | A | * | 3/1990 | Olson .................. C23C 10/02 428/656 |
| 5,319,923 | A | * | 6/1994 | Leonard ............... F23M 5/085 60/39.23 |
| 5,981,088 | A | * | 11/1999 | Bruce .................. C23C 14/083 416/241 B |
| 6,393,828 | B1 | | 5/2002 | Zhao et al. |
| 6,546,730 | B2 | | 4/2003 | Johnson et al. |
| 6,924,040 | B2 | * | 8/2005 | Maloney ............... C23C 30/00 428/312.8 |
| 7,150,922 | B2 | * | 12/2006 | Spitsberg ........... C23C 28/3455 416/241 R |
| 7,363,763 | B2 | * | 4/2008 | Coughlan, III ....... F23R 3/002 60/754 |
| 8,470,458 | B1 | * | 6/2013 | Persky ................ C23C 28/04 428/209 |
| 8,722,202 | B2 | | 5/2014 | Nagaraj et al. |
| 2009/0199837 | A1 | | 8/2009 | Tschirren |
| 2010/0162715 | A1 | * | 7/2010 | Nagaraj ................ F01D 5/284 60/752 |
| 2012/0047908 | A1 | * | 3/2012 | Poyyapakkam ....... F23R 3/002 60/785 |
| 2015/0345789 | A1 | | 12/2015 | Papple |
| 2016/0195273 | A1 | * | 7/2016 | Burd ................... F23R 3/005 415/115 |
| 2016/0370007 | A1 | | 12/2016 | Hongoh |

FOREIGN PATENT DOCUMENTS

| | | |
|---|---|---|
| EP | 3009744 | 4/2016 |
| EP | 3088559 | 11/2016 |
| WO | 2014130978 | 8/2014 |
| WO | 2015047472 | 4/2015 |
| WO | 2015077592 | 5/2015 |

OTHER PUBLICATIONS

European Patent Office, European Search Report dated Aug. 12, 2019 in Application No. 19156495.4.
USPTO, Restriction/Election Requirement dated Dec. 27, 2019 in U.S. Appl. No. 15/903,592.
USPTO, Final Rejection dated Oct. 5, 2020 in U.S. Appl. No. 15/903,592.
USPTO, Notice of Allowance dated Jun. 9, 2021 in U.S. Appl. No. 15/903,592.
USPTO, Preinterview First Office Action Mar. 3, 2020 in U.S. Appl. No. 15/903,592.
USPTO, First Action Interview Office Action dated Apr. 22, 2020 in U.S. Appl. No. 15/903,592.

* cited by examiner

PANEL BURN THROUGH TOLERANT SHELL DESIGN

CROSS REFERENCE TO RELATED APPLICATIONS

This application is a divisional of, claims priority to and the benefit of, U.S. Non-Provisional patent application Ser. No. 15/903,592, entitled "PANEL BURN THROUGH TOLERANT SHELL DESIGN," filed on Feb. 23, 2018. The '592 application claims priority to and benefit of U.S. Provisional Patent Application Ser. No. 62/618,841, entitled "PANEL BURN THROUGH TOLERANT SHELL DESIGN," filed on Jan. 18, 2018. Both of which are hereby incorporated by reference in their entirety for all purposes.

FIELD

The present disclosure relates to protective coatings for turbine combustion components, and specifically to protective coatings for inner surfaces of turbine combustion components.

BACKGROUND

The efficiency of turbine engines, for example gas turbines, is increased as the firing temperature, otherwise known as the working temperature, of the turbine increases. This increase in temperature results in at least some increase in power with the use of the same, if not less, fuel. Thus it is desirable to raise the firing temperature of a turbine to increase the efficiency.

However, as the firing temperature of gas turbines rises, the metal temperature of the combustion components, including but not limited to combustion shells, combustion panels, transition pieces otherwise known as ducts, and augmenters increases. A combustion panel is incorporated into a turbine, and defines, in part with a transition piece or duct, an area for a flame to burn fuel. These components, as well as other components in the gas path environment, such as the combustion shell for example, are subject to significant temperature extremes and degradation by oxidizing and corrosive environments.

Various techniques have been devised to maintain the temperature of gas turbine components below undesirable levels. For example, a coolant medium such as coolant air from the compressor of the turbine is often directed to a component along one or more component surfaces. Such flow is understood in the art as backside flow where the cooling medium is directed at a surface of the component not directly exposed to high temperatures such as the hot gases of combustion. One such component of the gas turbine is the combustor panel. It will be appreciated that the combustor panel confines the hot gases of combustion for flow along the combustor to a transition body for flow into the turbine section of the gas turbine. The combustor panel may be disposed inward from the combustor shell, or liner. An annulus may be disposed around the shell which receives the coolant air flow on the coolant side of the shell. The metal surface of the combustor shell facing the annulus is normally smooth.

SUMMARY

A dual wall liner for a gas turbine engine is disclosed, comprising a shell having a first side and a second side, a panel contacting the shell, the panel at least partially defining a hot gas path through which a hot gas flows, wherein the first side of the shell faces the panel, wherein the shell includes a thermal barrier coating (TBC) disposed on the first side of the shell.

In various embodiments, the panel is coupled to the shell.

In various embodiments, the dual wall liner further comprises a metallic layer in contact with the TBC.

In various embodiments, the shell is comprised of a shell material, an oxidation resistance of the metallic layer is greater than that of the shell material, and the metallic layer is at least twice as resistant to oxidation as the shell material.

In various embodiments, the TBC is disposed over the metallic layer.

In various embodiments, the TBC comprises a lower thermal conductivity than that of the shell material.

In various embodiments, the thermal conductivity of the TBC is less than half of that of the shell material.

In various embodiments, the dual wall liner further comprises a heat transfer augmentation feature disposed on the second side of the shell.

In various embodiments, the heat transfer augmentation feature is configured to at least one of increase a surface area of the second side or disturb a flow of cooling air flowing across the second side.

In various embodiments, the dual wall liner further comprises a panel stud coupling the panel to the shell, wherein the TBC surrounds the panel stud.

In various embodiments, the dual wall liner further comprises a plurality of holes extending through the shell and the TBC, wherein the plurality of holes are configured to direct a flow of cooling air from the second side of the shell to the panel.

A gas turbine engine combustor is disclosed, comprising a shell having a first side and a second side, a panel contacting the shell, the panel at least partially defining a hot gas path through which a hot gas flows, wherein the first side of the shell faces the panel, wherein the shell includes a thermal barrier coating (TBC) disposed on the first side of the shell.

In various embodiments, the panel is coupled to the shell.

In various embodiments, the gas turbine engine combustor further comprises a metallic layer in contact with the TBC.

In various embodiments, the shell is comprised of a shell material, the metallic layer is at least twice as resistant to oxidation as the shell material, the TBC comprises a lower thermal conductivity than that of the shell material, and the TBC is disposed over the metallic layer.

In various embodiments, the gas turbine engine combustor further comprises a heat transfer augmentation feature disposed on the second side of the shell, wherein the heat transfer augmentation feature is configured to at least one of increase a surface area of the second side or disturb a flow of cooling air flowing across the second side.

In various embodiments, the gas turbine engine combustor further comprises a panel stud coupling the panel to the shell, wherein the TBC surrounds the panel stud.

In various embodiments, the gas turbine engine combustor further comprises a plurality of holes extending through the shell and the TBC, wherein the plurality of holes are configured to direct a flow of cooling air from the second side of the shell to the panel.

A method for manufacturing a dual wall liner for a gas turbine engine is disclosed, comprising disposing a thermal barrier coating (TBC) on a first side of a shell, and coupling a panel to the shell, wherein the first side faces the panel.

In various embodiments, the method further comprises disposing a metallic layer on the first side, the TBC disposed over the metallic layer.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

A combustor shell, as disclosed herein, may include a thermal coating disposed on an inner surface, also referred to herein as a first side, of the combustor shell. The first side may not be directly exposed to the hot gas path of the combustor.

Thermal coatings may be costly and may increase the overall weight of the engine.

Figure 1:
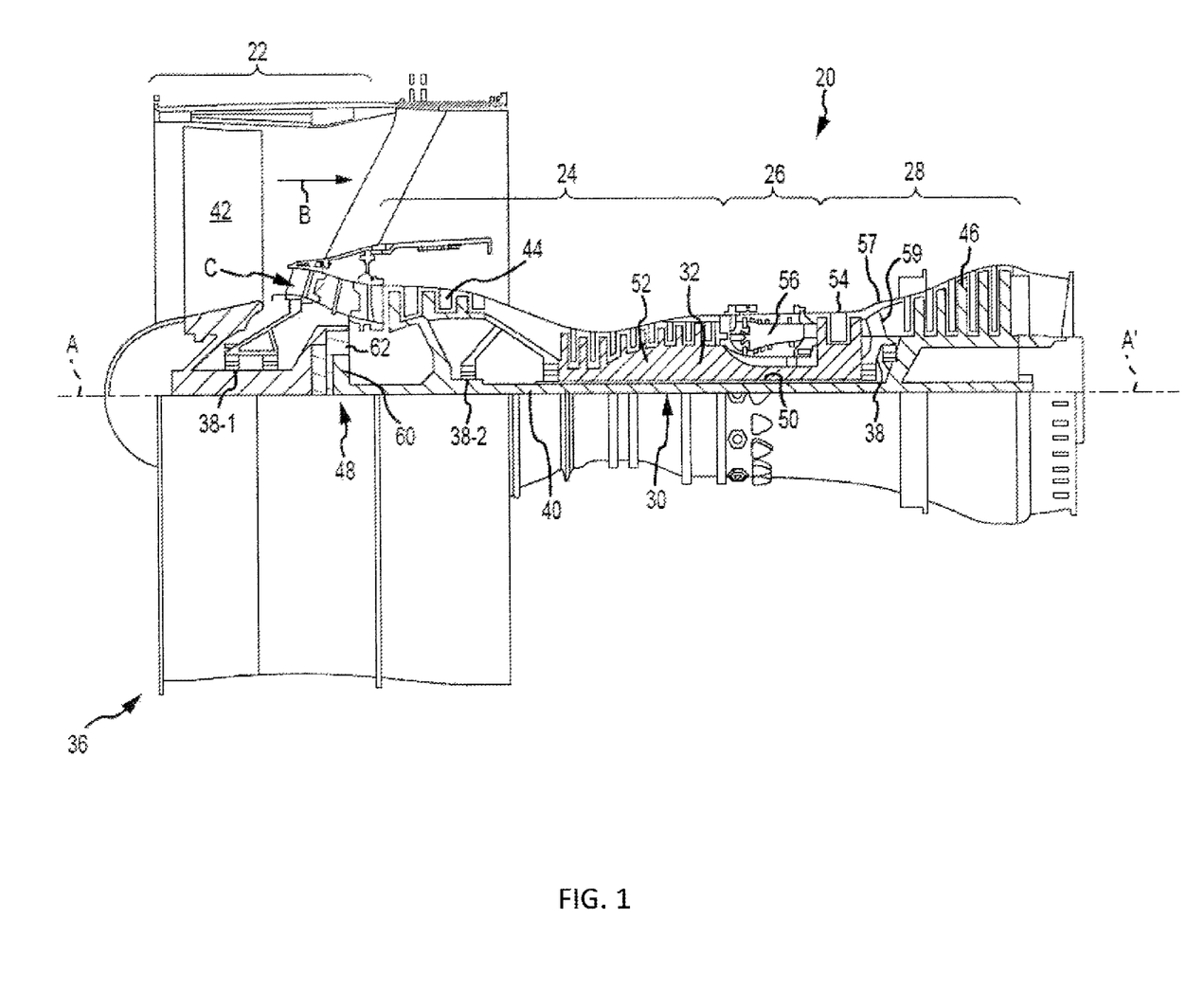
FIG. 1 is cross-sectional view of an exemplary gas turbine engine in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive air along a bypass flow-path B while compressor section 24 can drive air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 and a low pressure (or first) turbine section 46. Inner shaft 40 may be connected to fan 42 through geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure.

High speed spool 32 may comprise an outer shaft 50 that interconnects a high pressure (or second) compressor section 52 and high pressure (or second) turbine section 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Gear architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor section 44, and the low pressure turbine 46 may have a pressure ratio that is greater than about 5:1. Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other turbine engines including direct drive turbofans. A gas turbine engine may comprise an industrial gas turbine (IGT) or a geared engine, such as a geared turbofan, or non-geared engine, such as a turbofan, or may comprise any gas turbine engine as desired.

Figure 2:
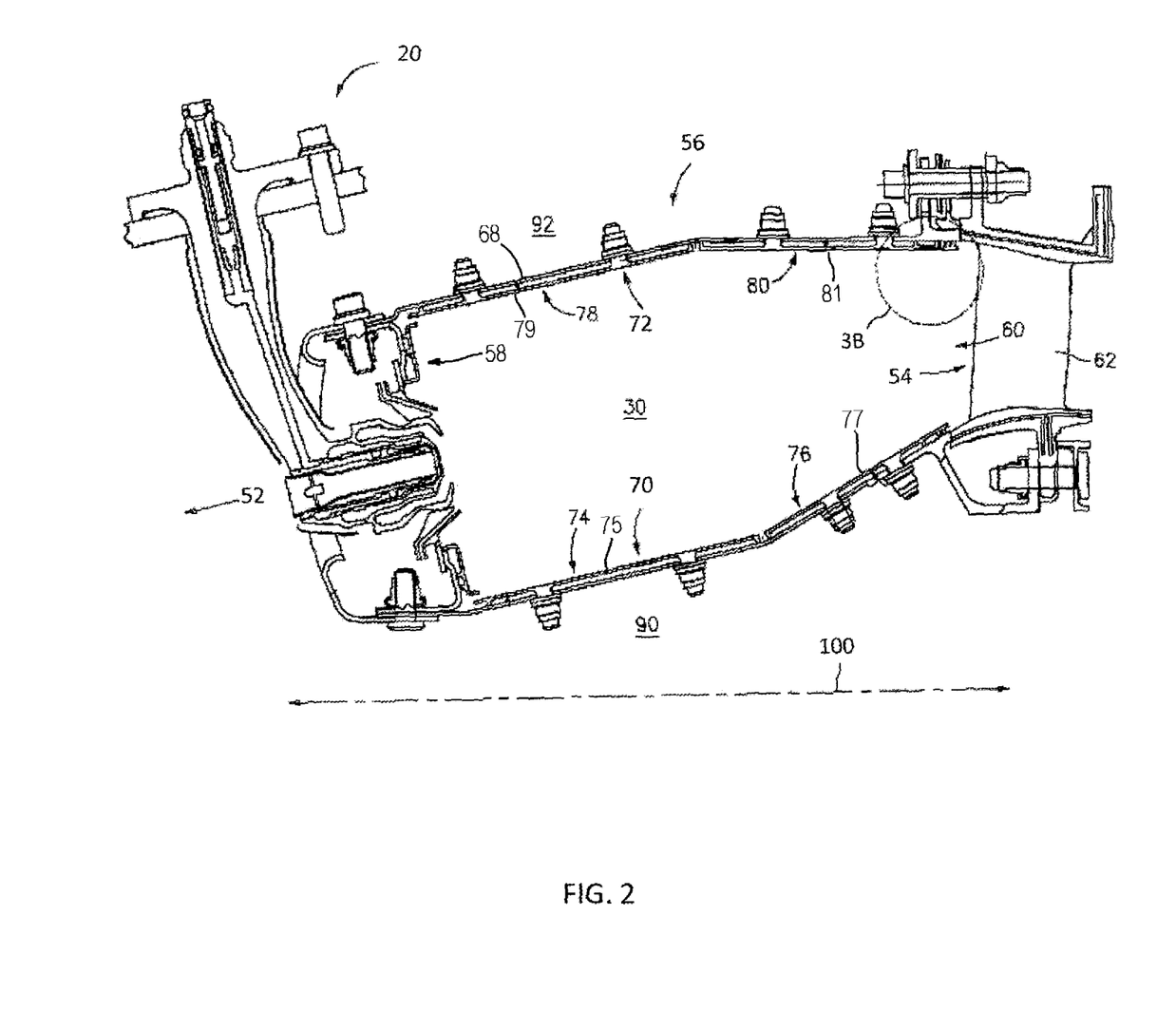
FIG. 2 is cross-sectional view of an exemplary combustor having a dual wall liner, in accordance with various embodiments.

With reference to FIG. 2, an exemplary combustor 56 positioned between compressor 52 and turbine section 54 of a gas turbine engine 20 having a central longitudinal axis or centerline axis 100 is illustrated, in accordance with various embodiments. Combustor 56 may have an annular combustion chamber 34 defined by inner wall 70 and outer wall 72 and bulkhead 58 spanning the walls 70, 72. Each wall 70, 72 can have one or more liners 74, 76, 78, 80, with each liner 74, 76, 78, 80 including a shell 68 and panels 75, 77, 79, 81. The panels 75, 77, 79, 81 face the combustion chamber 34 and shields the shells 68 from the combustion chamber 34. Alternate materials include ceramics and ceramic matrix composites. Various known or hereinafter developed other materials and manufacturing techniques may be utilized. In known fashion or otherwise, the panels may be spaced apart from the interior surface of the associated shell. The exemplary shells and panels may be foraminate, passing cooling air from annular chambers 90 and 92 respectively through inboard and outboard of the walls 70 and 72 into the combustion chamber 34. The exemplary panels may be configured so that the intact portions of their inboard surfaces are substantially frustoconical. Viewed in longitudinal section, these surfaces appear as straight lines at associated angles to the centerline axis 100. A combusting mixture is driven downstream within the combustor 56 to a combustor outlet 61 immediately ahead of a fixed first vane stage 63 of high pressure turbine 54.

Figure 3A:
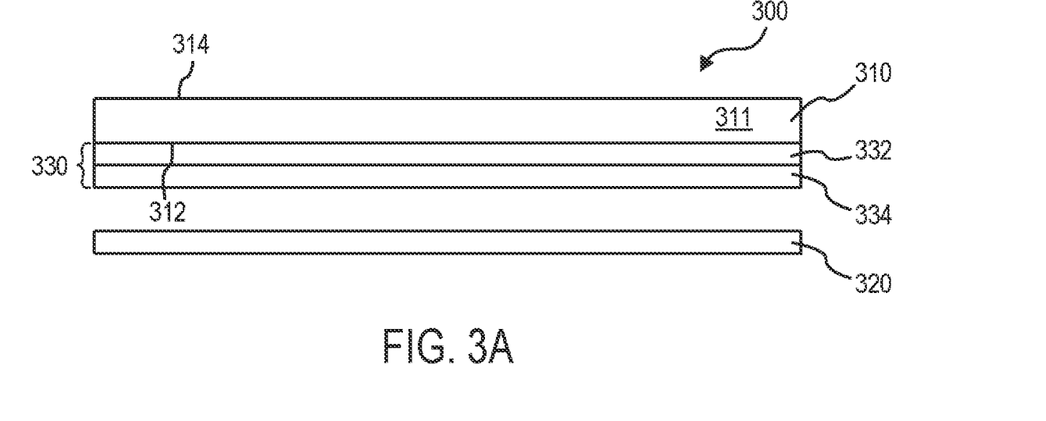
FIG. 3A is cross-sectional view of a dual wall liner having a thermal coating comprising a metallic layer and a thermal barrier coating (TBC), in accordance with various embodiments.

With reference to FIG. 3A, a cross-section view of a dual wall liner 300 for a gas turbine engine is illustrated, in accordance with various embodiments. Dual wall liner 300 may include a shell 310 and an associated panel 320, in accordance with various embodiments. Shell 310 may be similar to shell 68, with momentary reference to FIG. 2. In various embodiments, shell 310 may comprise a shell material 311. In various embodiments, shell material 311 may comprise a nickel alloy. Panel 320 may be similar to panel 75, panel 77, panel 79, and/or panel 81, with momentary reference to FIG. 2. Shell 310 may include a first surface 312 and a second surface 314. First surface 312 may face towards panel 320.

Dual wall liner 300 may further include a thermal coating 330 disposed on first surface 312 of shell 310. In this regard, thermal coating 330 may be disposed between shell 310 and panel 320. Thermal coating 330 may include a first layer (also referred to herein as a metallic layer) 332. Metallic layer 332 may be disposed onto first surface 312. Thermal coating 330 may include a second layer (also referred to herein as a thermal barrier coating (TBC)) 334. TBC 334 may be disposed onto metallic layer 332. In this regard, TBC 334 may be applied subsequent to metallic layer 332 being applied to shell 310. Thermal coating 330 may be applied using plasma spray deposition methods, electron beam vapor deposition, or any other suitable methods. In various embodiments, metallic layer 332 may comprise a nickel alloy. In various embodiments, TBC 334 may comprise a ceramic topcoat. In various embodiments, TBC 334 may comprise yttria-stabilized zirconia (YSZ). In various embodiments, TBC 334 may comprise mullite, alumina, Ceria, or any oxide having a thermal conductivity which is less than shell 310. In various embodiments, TBC 334 is corrosion and oxidation resistant.

Figure 3B:
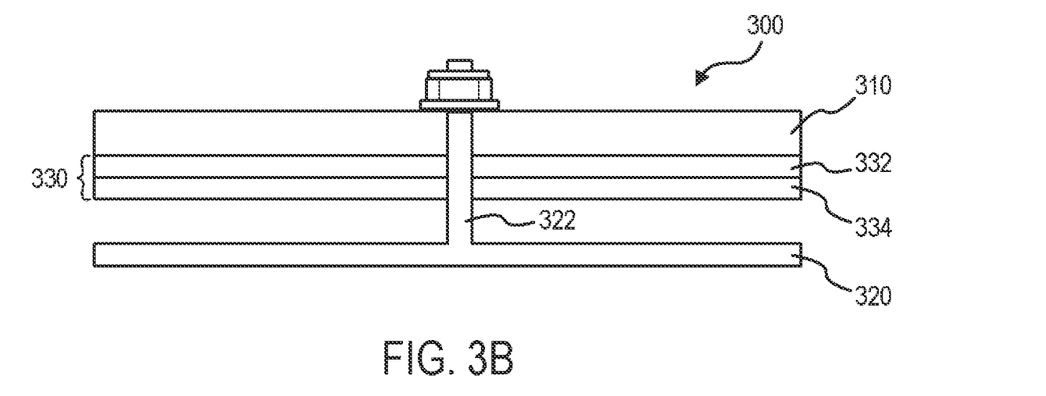
FIG. 3B is cross-sectional view of the dual wall liner with a panel stud coupling the panel to the shell, in accordance with various embodiments.

With reference to FIG. 3B, panel 320 may include one or more panel studs 322 for coupling panel 320 to shell 310. Panel stud 322 may extend from panel 320 and through shell 310. Panel stud 322 may be coupled to shell 310, with a fastener such as a nut for example. thermal coating 330 may surround panel stud 322. Stated differently, panel stud 322 may extend through thermal coating 330. In various embodiments, thermal coating 330 may be provided locally around panel stud 322 to resist corrosion of panel stud 322. In various embodiments, thermal coating 330 may be provided locally around panel stud 322 to resist corrosion of shell 310 at panel stud 322. Thermal protection of panel studs 322 may reduce the likelihood of a panel stud 322, and associated fastening members such as a washer and/or a nut for example, from being decoupled from shell 310.

Figure 3C:
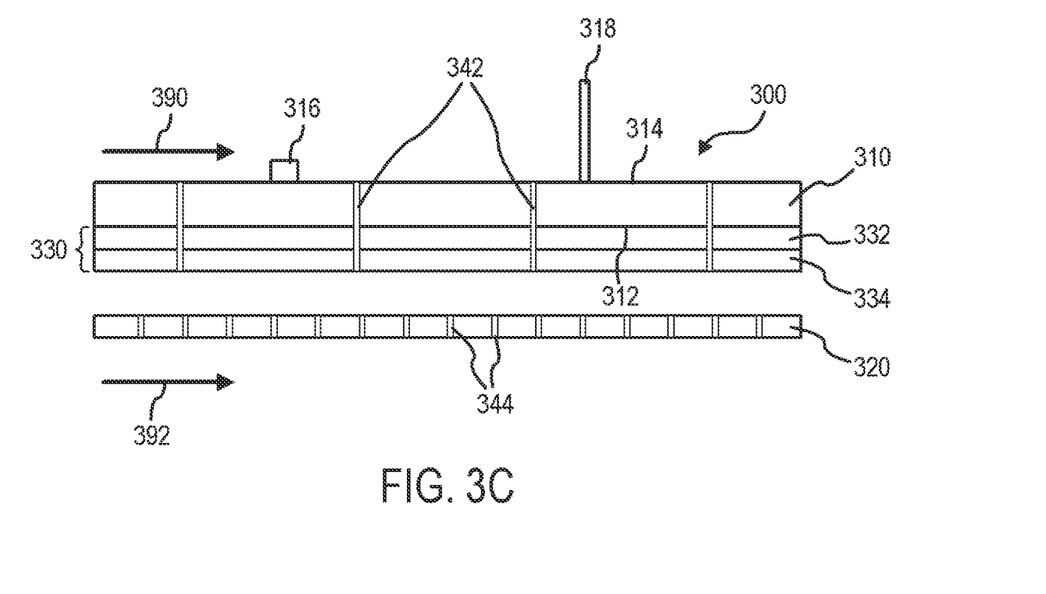
FIG. 3C is cross-sectional view of the dual wall liner with a plurality of holes extending through the shell and the thermal coating and heat transfer augmentation features extending from the shell, in accordance with various embodiments.

With reference to FIG. 3C, dual wall liner 300 may further include a plurality of holes 342 extending through shell 310 and thermal coating 330. Plurality of holes 342 may be configures to direct a flow of cooling air 390 from second side 314 of shell 310 to panel 320. This cooling air 390 may then travel through plurality of holes 344 disposed in panel 320 and into hot gas path 392. Hot gas path 392 may be defined by panel 320. In this regard, flow of cooling air 390 may transfer heat from shell 310 and panel 320 into hot gas path 392.

In various embodiments, dual wall liner 300 may further include one or more heat transfer augmentation features, such as trip strip 316 and/or cooling fin 318. Trip strip 316 may extend from second side 314. Trip strip 316 may be configured to increase a surface area of second side 314. Trip strip 316 may be configured to disturb the flow of cooling air 390 flowing across second side 314. Cooling fin 318 may extend from second side 314. Cooling fin 318 may be configured to increase a surface area of second side 314. Cooling fin 318 may be configured to disturb the flow of cooling air 390 flowing across second side 314.

With combined reference to FIG. 3A through FIG. 3C, in various embodiments, an oxidation resistance of metallic layer 332 should be greater than that of the shell material 311 to prevent oxidation and/or corrosion of metallic layer 332. In various embodiments, metallic layer 332 may comprise a material that is at least twice as resistant to oxidation than the shell material 311.

In various embodiments, the thermal conductivity of TBC 334 should be lower than that of shell material 311 to prevent heat transfer from hot gas path 392 to shell 310. In various embodiments, the thermal conductivity of TBC 334 may be less than half of that of shell material 311.

In various embodiments, although shell 310 may not be exposed to hot gas path 392 during normal operation, thermal coating 330 may provide added thermal protection to shell 310 in the event that panel 320 corrodes and holes are formed into panel 320. Stated differently, holes may form in panel 320 in response to panel 320 corroding due to thermal loading caused by hot gas path 392, which may expose shell 310 to hot gas path 392. Thus, thermal coating 330 may extend the life of shell 310.

Figure 4A:
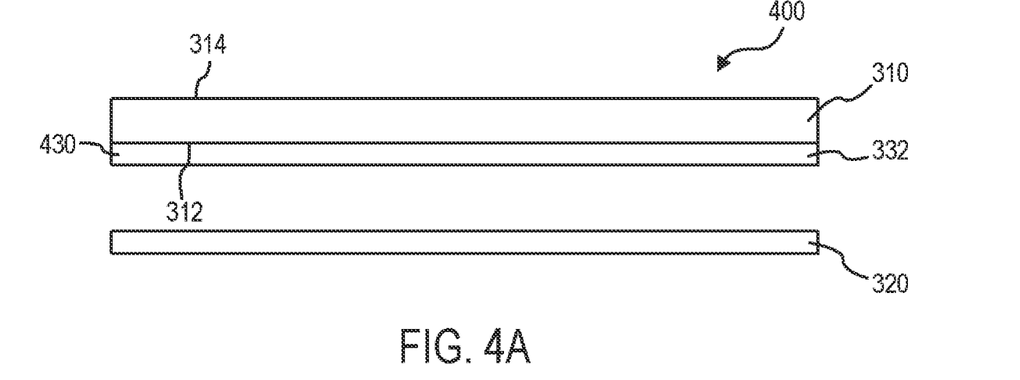
FIG. 4A is cross-sectional view of a dual wall liner having a thermal coating comprising a metallic layer, in accordance with various embodiments.
Figure 4B:
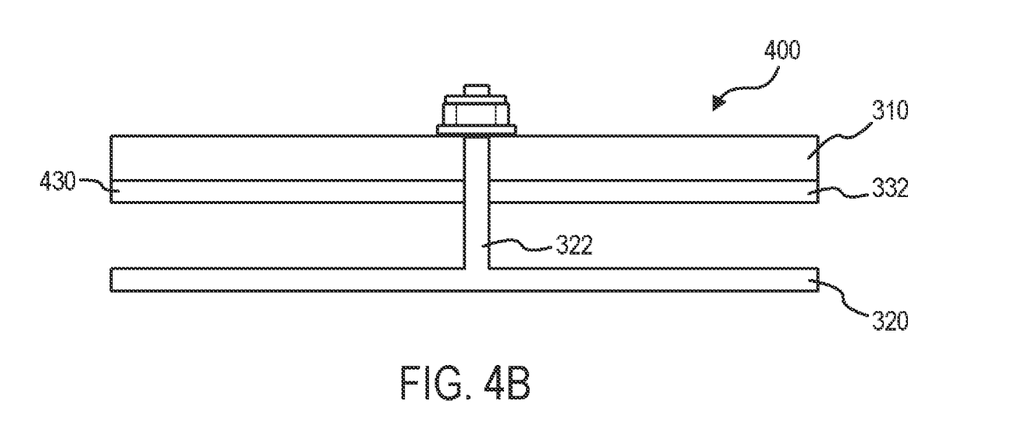
FIG. 4B is cross-sectional view of the dual wall liner with a panel stud coupling the panel to the shell, in accordance with various embodiments.
Figure 4C:
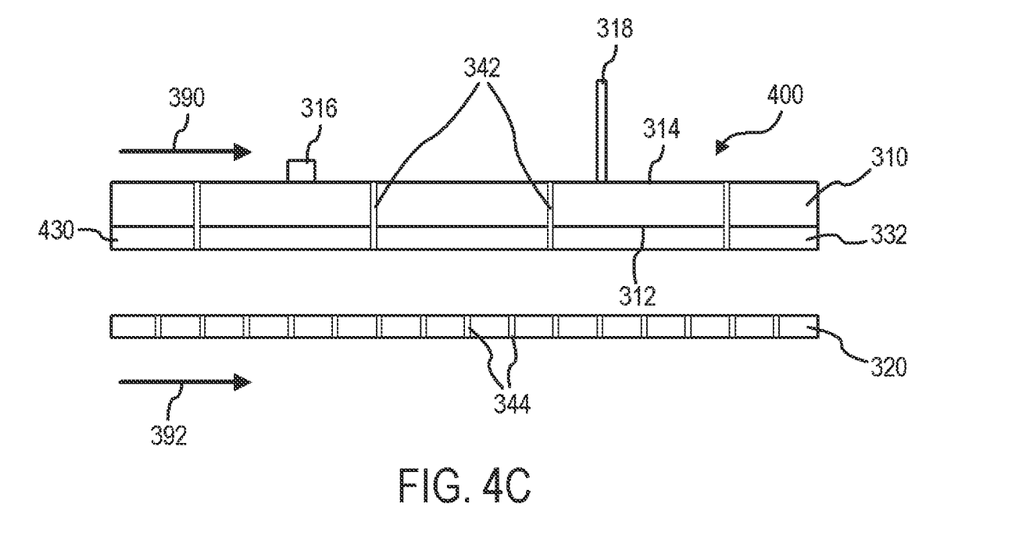
FIG. 4C is cross-sectional view of the dual wall liner with a plurality of holes extending through the shell and the thermal coating and heat transfer augmentation features extending from the shell, in accordance with various embodiments.

With reference to FIG. 4A, a dual wall liner 400 is illustrated, in accordance with various embodiments. Dual wall liner 400 may be similar to dual wall liner 300 of FIG. 3A through FIG. 3C, except that dual wall liner 400 includes a thermal coating 430 comprised of metallic layer 332. Stated differently, thermal coating 430 is devoid of TBC 334, with momentary reference to FIG. 3A through FIG. 3C. Thermal coating 430 may thermally protect shell 310 from heat being transferred from got gases in hot gas path 392 to shell 310. Thus, it is contemplated herein that thermal coating 430 may be comprised of metallic layer 332.

Figure 5:
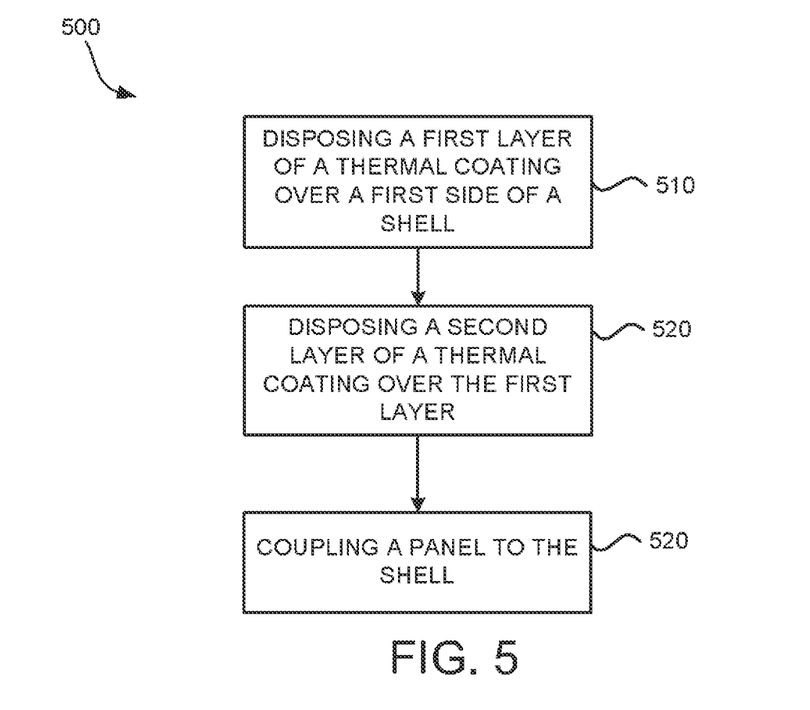
FIG. 5 is a method for manufacturing a dual wall liner, in accordance with various embodiments.

With reference to FIG. 5, a method 500 for manufacturing a dual wall liner is provided, in accordance with various embodiments. Method 500 includes disposing a first layer of a thermal coating over a first side of a shell (step 510). Method 500 includes disposing a second layer of a thermal coating over the first layer (step 520). Method 500 includes coupling a panel to the shell (step 530).

With combined reference to FIG. 4A and FIG. 5, step 510 may include disposing metallic layer 332 onto first side 312 of shell 310 (step 510). With combined reference to FIG. 3A and FIG. 5, step 520 may include disposing TBC 334 onto metallic layer 332 (step 520). With combined reference to FIG. 3A and FIG. 5, step 530 may include coupling panel 320 to shell 310

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine combustor, comprising:
    a shell having a first side and a second side opposite the first side, the shell comprises a shell material;
    a panel contacting the shell, the panel at least partially defining a hot gas path through which a hot combustion gas flows, wherein the first side of the shell faces the panel and the hot gas path;
    a thermal barrier coating (TBC) disposed on the shell material on the first side of the shell, wherein the TBC is comprised of a metallic layer;
    a first heat transfer augmentation feature extending from the second side of the shell, wherein the first heat augmentation feature comprises a trip strip; and
    a second heat transfer augmentation feature extending from the second side of the shell, wherein the second heat transfer augmentation feature comprises a cooling fin;
    wherein a shape of the first heat augmentation feature is different from a shape of the second heat transfer augmentation feature, and a height of the cooling fin is greater than a height of the trip strip.

2. The gas turbine engine combustor of claim 1, wherein the panel is coupled to the shell.

3. The gas turbine engine combustor of claim 1, wherein the TBC comprises a lower thermal conductivity than that of the shell material, wherein the thermal conductivity of the TBC and the thermal conductivity of the shell material are both measured under common predetermined reference conditions.

4. The gas turbine engine combustor of claim 2, further comprising a panel stud coupling the panel to the shell, wherein the TBC surrounds the panel stud.

5. The gas turbine engine combustor of claim 2, further comprising a plurality of holes extending through the shell and the TBC, wherein the plurality of holes are configured to direct a flow of cooling air from the second side of the shell to the panel.

6. A method for manufacturing a dual wall liner for a gas turbine engine, comprising:
- disposing a thermal barrier coating (TBC) on a first side of a shell, wherein the TBC is comprised of a metallic layer; and
- coupling a panel to the shell, the panel at least partially defining a hot gas path through which a hot combustion gas flows; wherein the first side of the shell faces the panel and the hot gas path, wherein the shell comprises the first side and a second side opposite the first side, and the shell comprises a shell material, wherein the TBC is disposed on the shell material;
- disposing a first heat transfer augmentation feature to extend from the second side of the shell, wherein the first heat augmentation feature comprises a trip strip; and
- disposing a second heat transfer augmentation feature to extend from the second side of the shell, wherein the second heat transfer augmentation feature comprises a cooling fin;
- wherein a shape of the first heat augmentation feature is different from a shape of the second heat transfer augmentation feature, and a height of the cooling fin is greater than a height of the trip strip.

* * * * *

UNITED STATES PATENT AND TRADEMARK OFFICE
CERTIFICATE OF CORRECTION

Page 1 of 1

PATENT NO. : 11,719,439 B2
APPLICATION NO. : 17/380494
DATED : August 8, 2023
INVENTOR(S) : Carey Clum It is certified that error appears in the above-identified patent and that said Letters Patent is hereby corrected as shown below:

On the Title Page

Item (73): please delete "Raythehon" and insert --Raytheon--

Signed and Sealed this
Twenty-fourth Day of October, 2023

Katherine Kelly Vidal
*Director of the United States Patent and Trademark Office*